UNITED STATES PATENT OFFICE.

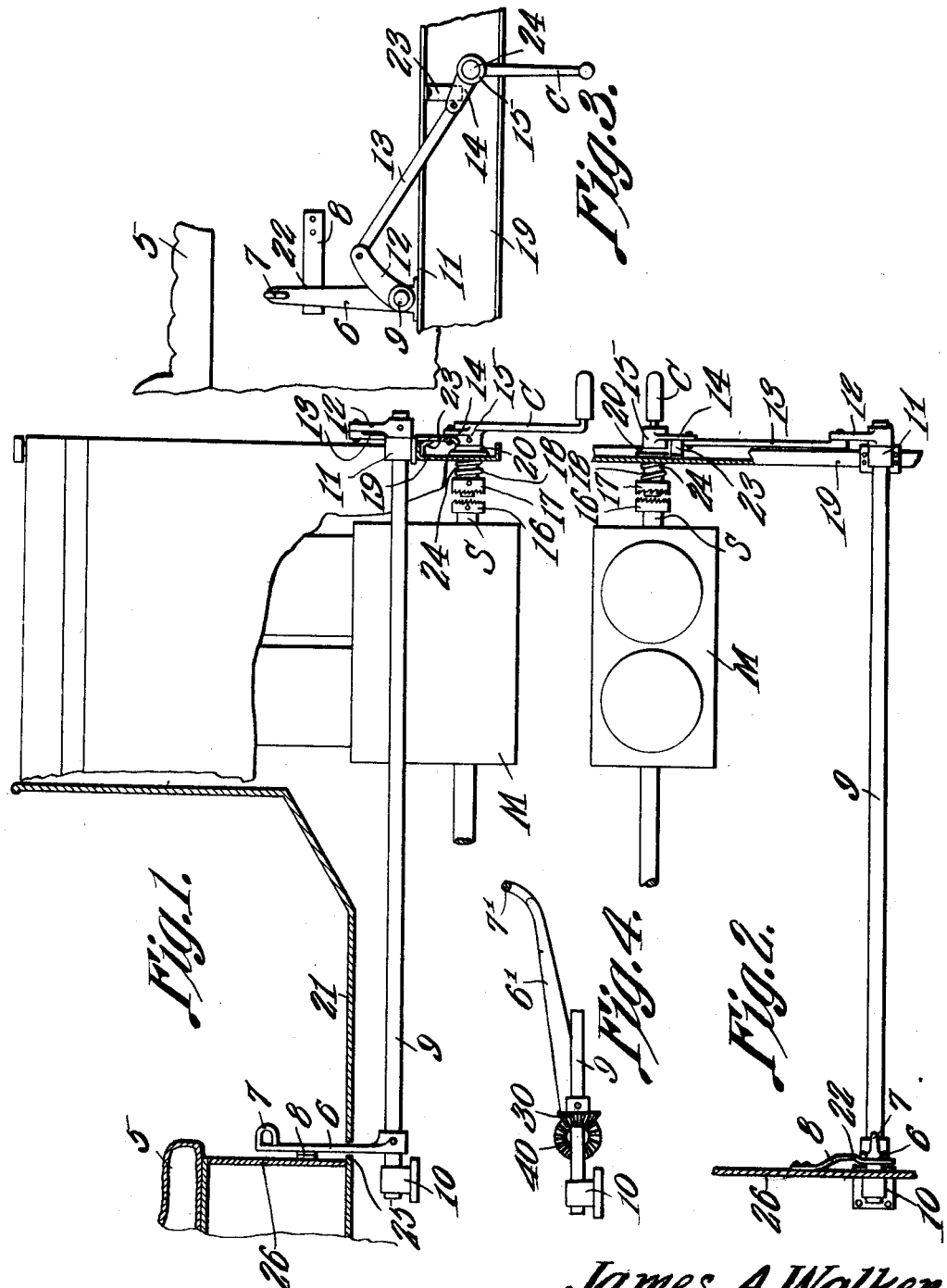

JAMES A. WALKER, OF ROCKFORD, ILLINOIS.

STARTING DEVICE FOR ENGINES.

1,025,344.  Specification of Letters Patent.  Patented May 7, 1912.

Application filed July 19, 1911. Serial No. 639,405.

*To all whom it may concern:*

Be it known that I, JAMES A. WALKER, a citizen of the United States, residing at Rockford, in the county of Winnebago and State of Illinois, have invented a new and useful Starting Device for Engines, of which the following is a specification.

This invention relates to starting devices for engines and particularly to starting devices for automobiles having internal combustion engines.

The object of this invention is to provide means for readily starting the engine from the operator's or chauffeur's seat, whereby it is not necessary to start the engine from the front as is customary.

Another object is to provide means for disengaging the starting mechanism from the crank at the end of the impelling stroke or movement of the starting mechanism.

With the above and other objects in view this invention resides in the novel construction, arrangement and combination of parts as hereinafter described and claimed and as shown in the accompanying drawings, in which similar reference characters indicate similar parts, and in which—

Figure 1 is a side elevation of the starting device applied to an automobile engine, a fragmental portion of the automobile being shown, and the relative parts being shown at the end of their impelling stroke. Fig. 2 is a top plan view thereof, with parts broken away. Fig. 3 is a front elevation, with parts broken away. Fig. 4 is a side elevation of a modified means for oscillating the rock shaft, parts broken away.

Referring specifically to the drawings, 5 designates the operator's seat of the automobile; 21, the foot board; M, the internal combustion engine; S, the engine crank shaft having the clutch member 16; and 24 the starter crank shaft mounted in a bearing 20 on the cross beam 19 and having the forward crank handle C and the rear clutch member 17 adapted to engage the clutch member 16. Between the clutch member 17 and the cross beam 19 is compressibly disposed a coiled spring 18 on the crank shaft 24 giving an inward tension to said crank shaft and clutch member 17.

A longitudinal rock shaft 9 extends from position below the operator's seat to the front end of the automobile and is supported in suitable bearings 10 and 11 mounted in the body or frame thereof, the bearing 11 being preferably secured to the cross beam 19. As shown, the rock shaft 9 is below the foot board 21 and at one side of the engine. A starting lever 6 on the rear end of the rock shaft 9 extends up through a lateral slot 25 in the foot board to a position below the seat 5 and has the upper handle 7. A leaf spring 8 is secured to the seat frame 26 and has the free end thereof offset to form a shoulder 22. When the lever 6 is swung in an erect position the shoulder 22 snaps over the sides thereof to retain same in such position.

An arm 12 is secured to the front end of the rock shaft 9 and an arm 14 somewhat shorter than the arm 12 extends from the hub 15 of the crank C. A pitman 13 of a flat bar of resilient metal connects the arms 12 and 14 and by reason of its resiliency gives an inward tension to the crank shaft 24 in addition to the tension of the spring 18. A cam 23 is secured to the cross beam 19 and is arranged in the path of the arm 14 whereby at the end of its working stroke the said arm is forced outward against the tension of the spring 18 and the spring pitman 13 carrying the crank shaft 24 outward to disengage the clutch members 17 and 16.

In operation, the spring 8 is released from the lever 6 and the lever is depressed to make the arms 12 and 14 assume a suitable position for starting, the arm 14 sliding off of the cam 23, allowing the clutch member 17 to be sprung inward to engage the clutch member 16. Then by raising the lever 6 by manual force motion is impelled to the engine crank shaft to start the engine and at the end of the impelling stroke the arm 14 strikes the cam 23 to disengage the clutch members. The ratio of the length of arms 12 and 14 allows for a comparatively short stroke of the lever 6 with respect to the stroke of the crank shaft, whereby upon a slight movement of the lever 6 the crank shaft is given a suitable movement to start the engine. The crank 8 also holds the said parts in position at the end of the impelling stroke to prevent the reverse movement thereof until desired.

In the form shown in Fig. 4 the rock shaft 9 is provided with a bevel gear 30 which meshes with a bevel gear 40 to which is attached a longitudinally swinging lever 6' having the outer handle 7'. In substituting this means for actuating the rock shaft the operator gives the lever 6' an upward and backward pull which starts the engine instead of giving the same a lateral and upward swing as is necessary with the lever 6. It is understood, however, that either of the means for actuating the rock shaft can be used.

If desired, the engine may be started from the front of the automobile in the customary manner by means of the crank C.

Having described my invention what I claim as new is:

1. The combination with an engine crank shaft and a clutch member thereon, of a starter crank shaft, a clutch member carried thereby to engage the former clutch member, an arm projecting from the starter crank shaft, a cam mounted in the path of the said arm to disengage the clutch members, a rock shaft, an arm secured thereto, and a resilient pitman connected to said arm and giving an inward tension to the said starter crank shaft.

2. The combination with an engine crank shaft and a clutch member thereon, of a spring-pressed starter crank shaft, a clutch member carried by the said starter crank shaft and adapted to engage the former clutch member, an arm projecting from the starter crank shaft, a cam mounted in the path of said arm to disengage the said clutch members, a rock shaft, an arm secured thereto, a pitman connecting the said arms, a lever secured to the said rock shaft, and a spring adapted to engage the lever at the end of the stroke of same to retain the clutch members in disengaged position.

In testimony that I claim the foregoing as my own, I have hereto affixed my signature in the presence of two witnesses.

JAMES A. WALKER.

Witnesses:
WARD I. NICHOLAS,
WALTER B. BARRIE.

---

Copies of this patent may be obtained for five cents each, by addressing the "Commissioner of Patents, Washington, D. C."